US011334864B2

(12) United States Patent
Bloys et al.

(10) Patent No.: US 11,334,864 B2
(45) Date of Patent: May 17, 2022

(54) MOBILE WALLET COGNITIVE REWARDS RECOGNITION SYSTEM AND METHOD

(71) Applicant: INTERNATIONAL BUSINESS MACHINES CORPORATION, Armonk, NY (US)

(72) Inventors: John E. Bloys, Bethlehem, PA (US); Michael J. Bordash, Newtown, CT (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 15/808,279

(22) Filed: Nov. 9, 2017

(65) Prior Publication Data
US 2019/0139019 A1    May 9, 2019

(51) Int. Cl.
  *G06Q 20/22*    (2012.01)
  *G06Q 30/02*    (2012.01)
  *G06Q 20/34*    (2012.01)
  *G06Q 20/36*    (2012.01)

(52) U.S. Cl.
  CPC ......... *G06Q 20/227* (2013.01); *G06Q 20/34* (2013.01); *G06Q 20/363* (2013.01); *G06Q 30/0239* (2013.01)

(58) Field of Classification Search
  None
  See application file for complete search history.

(56) References Cited

U.S. PATENT DOCUMENTS

| 2011/0320345 | A1 | 12/2011 | Taveau et al. | |
| 2014/0201026 | A1* | 7/2014 | Adoni | G06Q 30/0631 705/26.7 |
| 2014/0279509 | A1 | 9/2014 | Khilnani et al. | |
| 2015/0012425 | A1* | 1/2015 | Mathew | G06Q 30/0227 705/41 |
| 2015/0220915 | A1 | 8/2015 | Rosenberg | |
| 2016/0307196 | A1 | 10/2016 | Achhra et al. | |

FOREIGN PATENT DOCUMENTS

WO    2013179038    12/2013

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

*Primary Examiner* — Michael J Sittner
(74) *Attorney, Agent, or Firm* — Schmeiser, Olsen & Watts, LLP; Stephanie Carusillo

(57) ABSTRACT

The present invention provides a method and system for cognitive rewards recognition in a mobile wallet of a user. A cognitive rewards recognition software application installed in the mobile wallet for each purchase opportunity: determines payment options and associated rewards; determines cognitive factors linking and relating the user, the payment options, and the rewards to purchases; and generates a ranked list of the payment options in response to the cognitive factors, wherein the rewards are distributed between purchases to maximize benefits to the user in response to the related cognitive factors. The ranked list is presented for each purchase opportunity to the user on his mobile wallet.

17 Claims, 7 Drawing Sheets

US 11,334,864 B2

MOBILE WALLET COGNITIVE REWARDS RECOGNITION SYSTEM AND METHOD

TECHNICAL FIELD

The invention relates generally to the field of processing payment transactions on a mobile wallet, and in particular to a method and system using cognitive rewards recognition for organizing, ordering and maximizing reward data available to a user with a mobile wallet having numerous payment and reward options.

BACKGROUND

Conventional mobile wallet payment transaction systems and methods are known in which mobile devices aka portable electronic devices such as smartphones, laptops, personal digital assistants, personal music players, mobile handsets, handheld computing devices, etc. include an electronic wallet software application installed thereon to process and manage secure payment transactions between a user and a payment service provider. Typically, these mobile devices are configured to enable payment transactions to be made from the electronic wallet as an online, Internet based transaction. Accordingly, there is a need for improved systems and methods to facilitate mobile wallet payment transactions.

SUMMARY

The present invention provides a method, and associated computer system and computer program product, for cognitive rewards recognition in a mobile wallet of a user. The method includes the steps of: determining for a purchase opportunity, by a cognitive rewards recognition software application installed in the mobile wallet, a plurality of payment options and associated rewards for each of the payment options used to purchase an item being a good or service, wherein the rewards are user benefits; determining for the purchase opportunity, by the cognitive rewards recognition software application in the mobile wallet, cognitive factors linking and relating the user, the plurality of payment options, and the rewards to purchases; generating for the purchase opportunity, by the cognitive rewards recognition software application in the mobile wallet for each purchase opportunity, a ranked list of the plurality of payment options in response to the cognitive factors, wherein the rewards are distributed between purchases to maximize benefits to the user in response to the related cognitive factors; and presenting for the purchase opportunity, by the cognitive rewards recognition software application in the mobile wallet, the ranked list for each purchase to the user on the mobile wallet.

DETAILED DESCRIPTION

Figure 1:
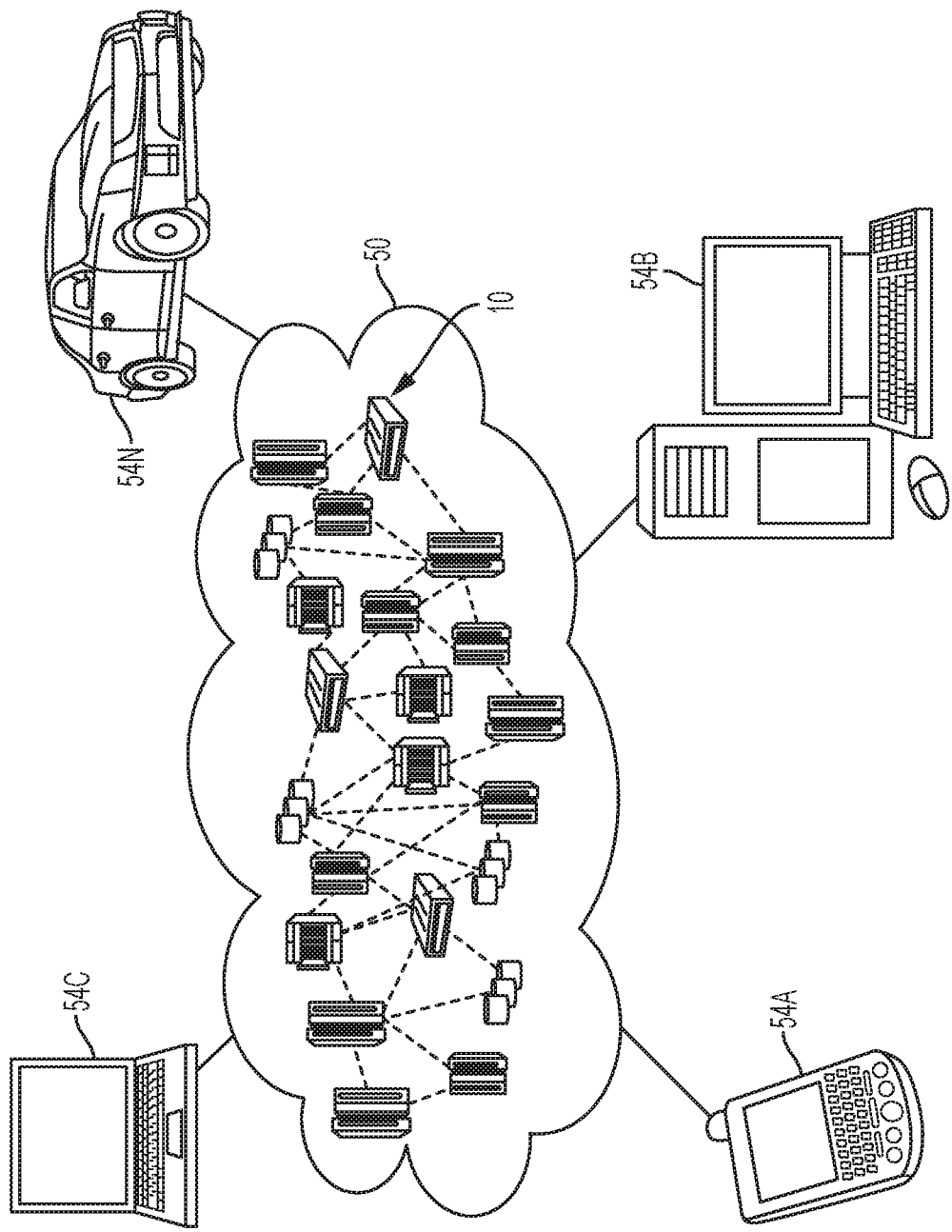
FIG. 1 depicts a cloud computing environment according to an embodiment of the present invention.

In the following description, specific details are set forth although it should be appreciated by one of ordinary skill that the present invention can be practiced without at least some of the details. In some instances, known features or processes are not described in detail so as not to obscure the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
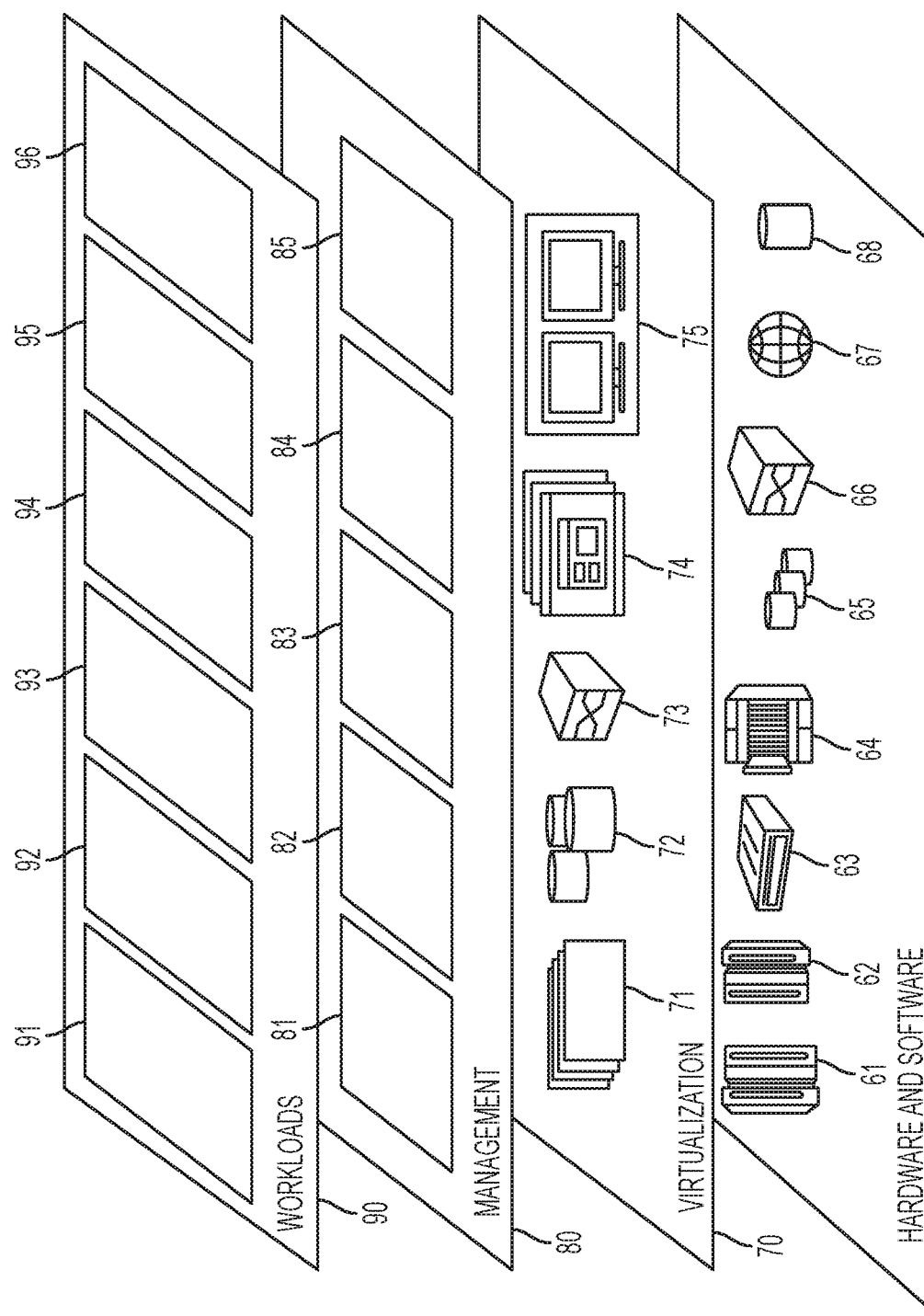
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive computing 96 in a mobile wallet application for determining payment options to maximize associated rewards when a user is considering a purchase opportunity of a good or service.

Figure 3:
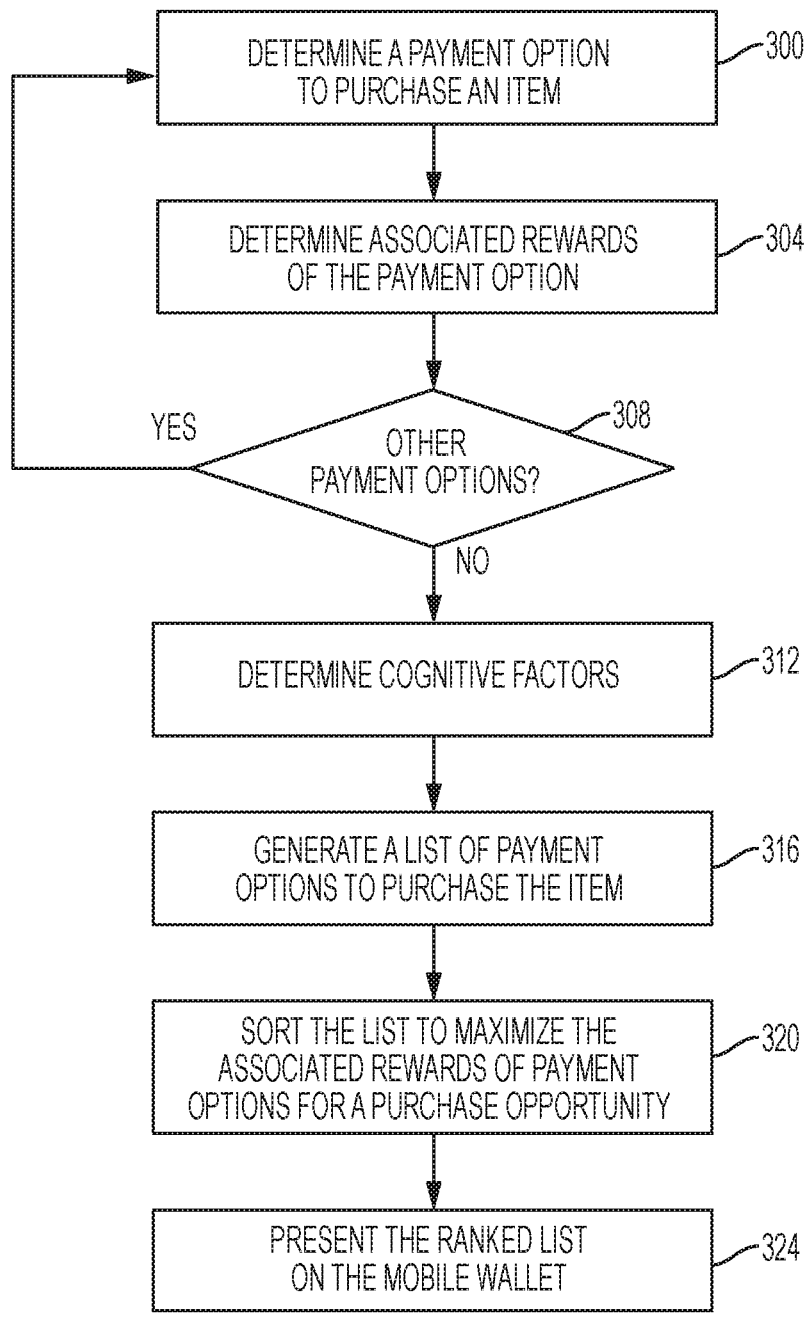
FIG. 3 is a flowchart diagram of a method according to an embodiment of the present invention.

FIG. 3 is a flowchart diagram of a method according to an embodiment of the present invention. In one preferred embodiment the method is carried out by a software application such as a cognitive recognition rewards (mobile) app loaded onto a user's mobile phone for use in conjunction with a mobile wallet application.

When a user is considering to purchase an item defined as a good or service, he or she will first determine a payment option in step 300, whereby the payment options include various credit cards, debit cards, gift cards and loyalty cards which typically offer rewards upon use. Rewards are considered to be benefits bestowed upon the user of the card. The rewards associated with a first payment option (e.g. first credit card) are determined in step 304. Many variables can come into play in consideration of each payment option such as the expiration date of the credit card, where the card can be used (e.g. specific stores), whether the card can be used to purchase the particular item being considered for purchase, whether the prospective purchase will exceed a limit on the card, etc. Associated rewards of the first credit card can vary according to the specific time and date of a purchase, the location of a purchase, whether the purchase opportunity would change the available reward, whether other coupons or discounts are concurrently offered for the purchase, etc.

In decision step 308, the method determines whether the user has other payment options at his disposal. For instance if he has another credit card in his mobile wallet that could be used for the same purchase opportunity, then the method loops back through steps 300 and 304 to determine the associated rewards available for use of the next, in this case the second, credit card. The payment options could also include debit cards, loyalty cards, gift cards and any other type of payment option that is linked to a reward or benefit of its use in making payment for a purchase.

A credit card extends a line of credit to a purchaser. A debit card is issued by a bank allowing the holder of the card to transfer money electronically to another bank account when making a purchase. A loyalty card is issued to a customer by a supermarket or chain store allowing him to qualify for rewards or discounts if he continue to shop there. A gift card, gift voucher, gift token or gift certificate is a prepaid stored-value money card usually issued by a retailer or bank to be used as an alternative to cash for purchases within a particular store or related businesses.

Once all the payment options of the purchaser/user have been considered in step 308, then the method moves on to step 312 where cognitive factors are determined for each established payment option. Cognitive factors is terminology which refers in this case to cognitive computing or computerized cognitive reasoning by linking and relating the user via the mobile app on his mobile phone or similar device with the various payment options and rewards available for each purchase opportunity.

Cognitive factors are determined that are available within the user's mobile wallet relating to features such as, but not limited to:

1. Location. A user's current location can be determined as well as the locations of nearby stores and other retail venues which accept a particular payment option such as a credit card to purchase a particular good or service;
2. Weather. The current weather (or the weather at a specific date/time) at or near the user's current location, or at the location of a prospective purchase can be determined;
3. Establishment. The type of purchasing venue can be identified, such as whether the purchasing venue is a gas station or a grocery store.
4. The type of each payment card (payment options such as credit cards, debit cards, gift cards, loyalty cards, etc.) available within the user's mobile wallet can be determined as well as offers available for each of the payment options for a particular purchase opportunity.
5. Current reward balances can be determined for all payment cards within the mobile wallet.
6. Near future balances can be determined for each payment card within the user's mobile wallet. For instance, a given card may offer a 5% discount off of any clothing purchases within each calendar month up to $500 in expenditures, then for expenditures within the same calendar month the discount would rise to 7% for additional purchases above the $500 payment plateau. This system could also be considered as a tier system whereby a first tier of purchases would receive a first reward, a second tier of purchases would receive a second reward different from the first reward, etc. The tiers could be gauged by dollar amounts spent, dates, use of a particular card at a specific location or store, etc.
7. Item. The type of item in a purchase basket of items to be purchased, such as a specific brand of soup, or a specific flavor or size of coffee creamer.
8. Available meta-data collected via a personalization tag and connected by opt-in data whereby the user has agreed (opted-in) to receiving data from any given source, such as notifications of sales, items about to be discontinued, etc. Other meta-data includes, for instance, marital status, gender, age, prior purchase data, etc.
9. Additional points of interest including, but not limited to, calendar information, purchase history, GPS data and points of interest, regular schedule of the user, local events, seasonal events (e.g. annual men's coat sale each fall), etc.

In step 316 a list of payment options is generated for the prospective purchase. The list is sorted and ranked in step 320 to maximize the associated rewards of the payment options for a purchase opportunity. In one embodiment, the cards will be ranked or ordered with the card having the greatest user benefit or reward at the top of the list and the other cards sequential listed thereafter in accordance with reward benefits. For instance, the user has three cards available in his mobile wallet to pay for fuel at a gas station. A first card offers 5 cents off per gallon for purchases. A second card offers $5.00 off for car wash with a fill-up, and a third card offers free monthly card services from the credit card company (valued at $12.00) for each month that a minimum of $500 is charged to the card.

In this example the user needs 15 gallons of gas to fill his vehicle at a cost of $2.50 per gallon. The total charge will be $37.50 and using the first card would save him $0.05*15 gallons=$0.75. The second card would save him $5.00 if he plans to use the car wash. The third card has already been charged $375.00 worth of goods for the current month so spending another $37.50 would bring his monthly expenditure total to $412.50. The ranked list would include:

1. Card 2=save $5.00 off card wash.
2. Card 1=save $0.75 off gas cost.
3. Card 3=no savings today. Tier 1 expenses would increase to $412.50. Tier 2=$500 spent for $12.50 savings.

The ranked list is presented in step 324 to the user as a summary of his purchase opportunities with each of the three different payment cards and their associated rewards. The user can then make an informed decision on which credit card to use based upon the cognitive rewards recognition method of the mobile phone cognitive rewards recognition app of the various payment options and corresponding rewards that are available and presented to the user. If he's planning to get a car wash anyway, it seems that the $5.00 car wash saving may be the maximum benefit. On the other hand if doesn't want or need a car wash, then he would likely consider the other options. If he's planning on spending and charging enough money on card 3 to move to the tier 2 threshold of $500 and saving the monthly $12.50 banking fee, then he may select to use card 3 for his gasoline purchase. On the other hand if he will not charge any more money by the end of the month, then he may choose to use card 1 for his gas purchase and $0.75 savings.

Figure 4:
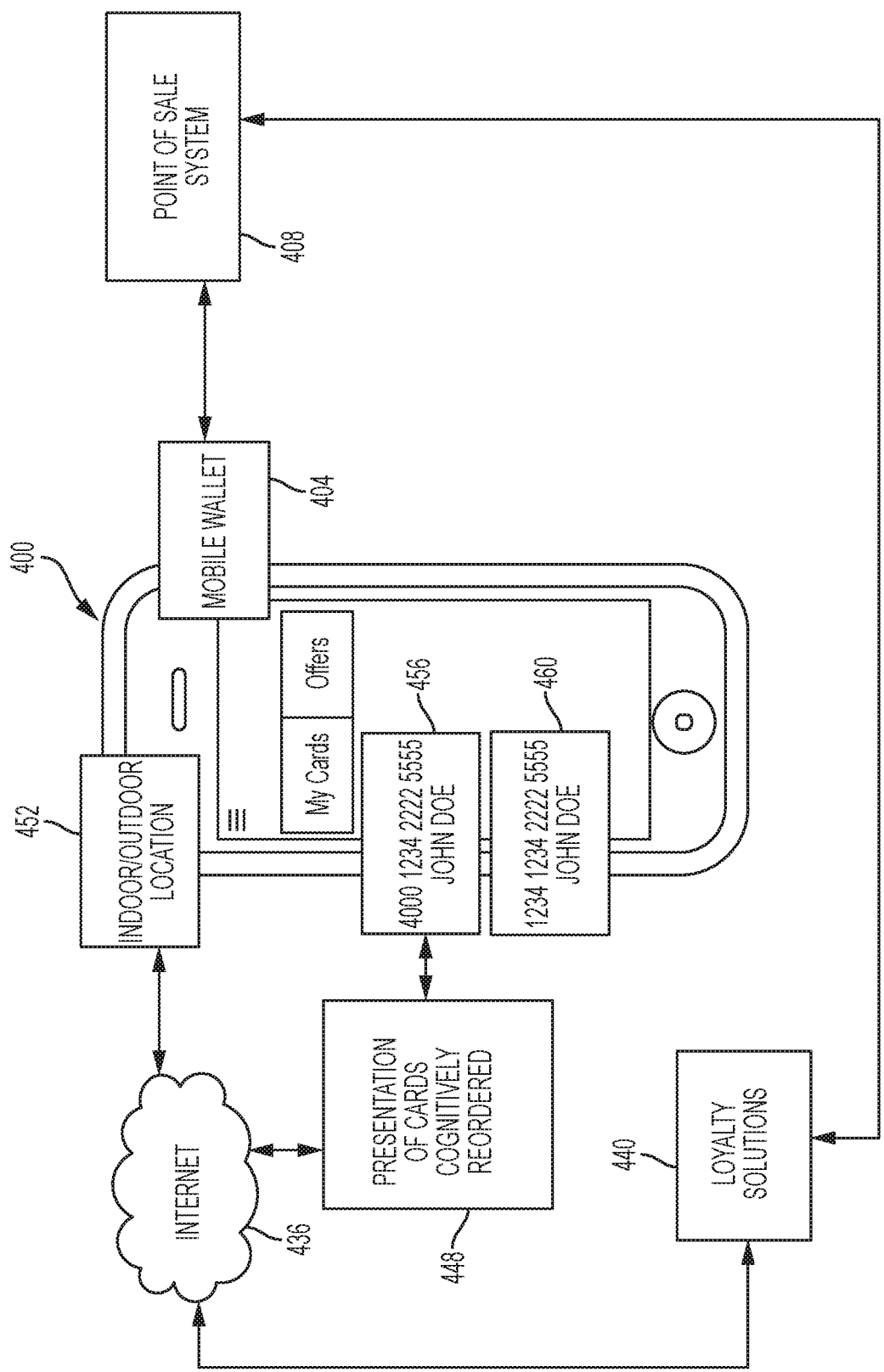
FIG. 4 is a diagrammatic representation of components for use with the operation of a system and method according to the present invention.

FIG. 4 is a diagrammatic representation of components for use with operating a system and method according to the present invention.

A mobile wallet software application 404 is installed onto the user's wireless mobile device 400, such as a smart phone, laptop, tablet, etc. A gift card 456 and a debit card 460 are illustrated as being among the payment options available within the user's mobile wallet. A purchase of an item occurs at a point of sale 408. The mobile wallet app receives data from various sources, such as from user input profile data or from the Internet 436. The payment options including the cards 456 and 460 could be linked to loyalty solutions and rewards 440 that are offered to the user for continued use of a particular card. The Internet 436 can provide data such as weather data, location data, etc. which displayed in a display area 452 (here enlarged and extracted) of the mobile phone. Presentation 448 of the payment options or cards can be cognitively ordered and listed by the cognitive rewards recognition app for the user.

In one example of the cognitive rewards recognition method, John is on vacation with his family. His credit card offers rewards which can be redeemed for airline miles, rental cars, and hotel stays. When John's flight lands, he collects his bags and his family and heads over to the rental car station. At the station he's asked to swipe his credit card. He goes into his mobile wallet to select a credit card that offers rewards and sees that if he were to apply his rewards from Card A towards the rental car he'd save $10 off his trip. He also sees that using Card B's rewards would provide him $5 off the rental car fee. However, the wallet is smart enough to recognize that John also has an associated hotel stay with a hotel chain. Applying Card A's points towards his stay at the hotel will save him $15 off his hotel lodging costs. The cognitive rewards recognition app in his mobile wallet suggests that John could maximize his benefits by (1) using Card B's rewards for the rental car, and (2) saving Card A's rewards to apply towards his hotel stay.

At first glance it would seem that Card A's $10 off should be recommended because Card A's $10 savings is greater than Card B's $5 savings. However, the cognitive rewards recognition app was able to reason and understand the bigger picture using cognitive reasoning by knowing John's future travel and reservation plans and therefore suggesting the use of appropriate cards to maximize his rewards. Tapping on each card option on the ranked list, John might see additional information for why one card is suggested over another, giving John the freedom to make his own educated decision.

Figure 5A:
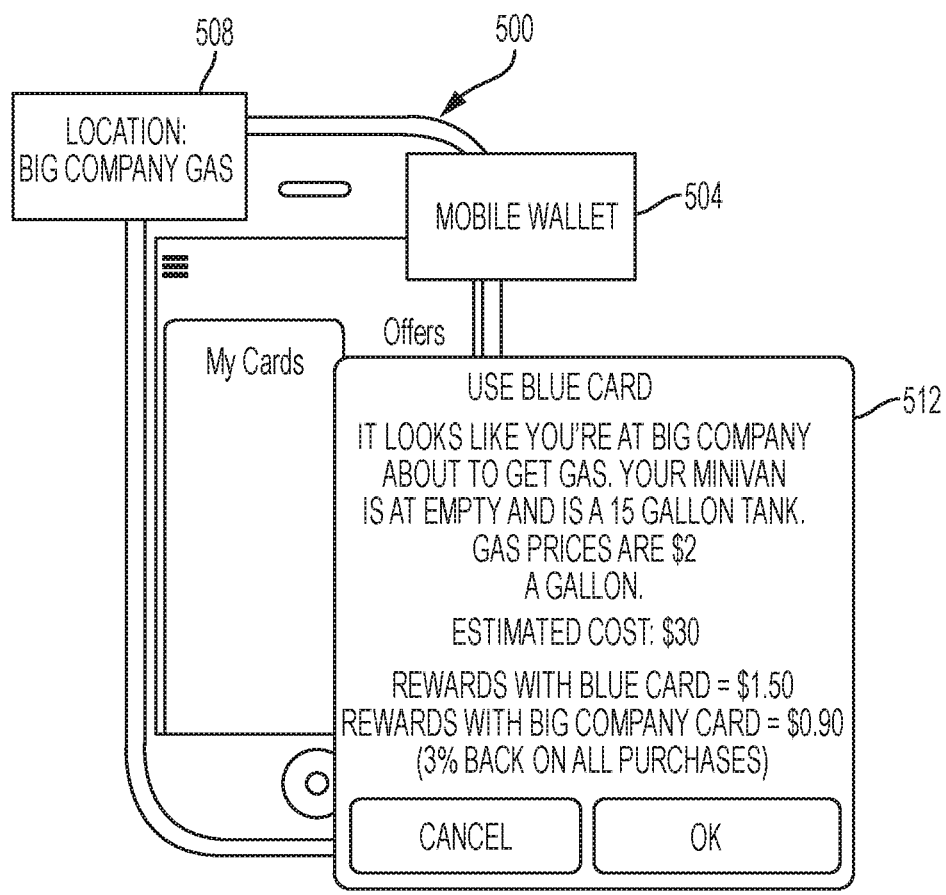
FIG. 5A is a diagrammatic representation of operation of a method according to a first embodiment of the present invention.

FIG. 5A is a diagrammatic representation of operation of a method according to a first embodiment of the present invention. Lisa's smart phone 500 includes a mobile wallet application 504 installed thereon. Further, the mobile wallet app includes the cognitive rewards recognition app as described herein.

In the example illustrated by FIG. 5A, Lisa is notified in display area 508 on her mobile phone that her current location is at Big Company gas. Lisa has the option of using her Blue Card when paying for gas for her car since it boasts 5% back on gas purchases. However, Lisa also has a Big Company credit card so she is unsure which card will give her the best rewards. Without the use of the cognitive rewards recognition app, Lisa may not make the best decision to maximize her rewards benefits. When using the cognitive rewards recognition app, analysis of her options are presented to her on the cell phone display screen 512 (enlarged and expanded from the phone 500 in FIG. 5A for clarity). The recommendation by the app is to USE BLUE CARD as displayed on the top of the screen 512. Details of the cognitive analysis presented on her display screen include:

Estimated cost: $30
Rewards with Blue card=$1.50
Rewards with Big Company card=$0.90
(3% back on all purchases)

If Lisa accepts the recommendation to use her Blue Card, she would select OK to move forward with the purchase. Otherwise she could select CANCEL and choose another payment option.

Figure 5B:
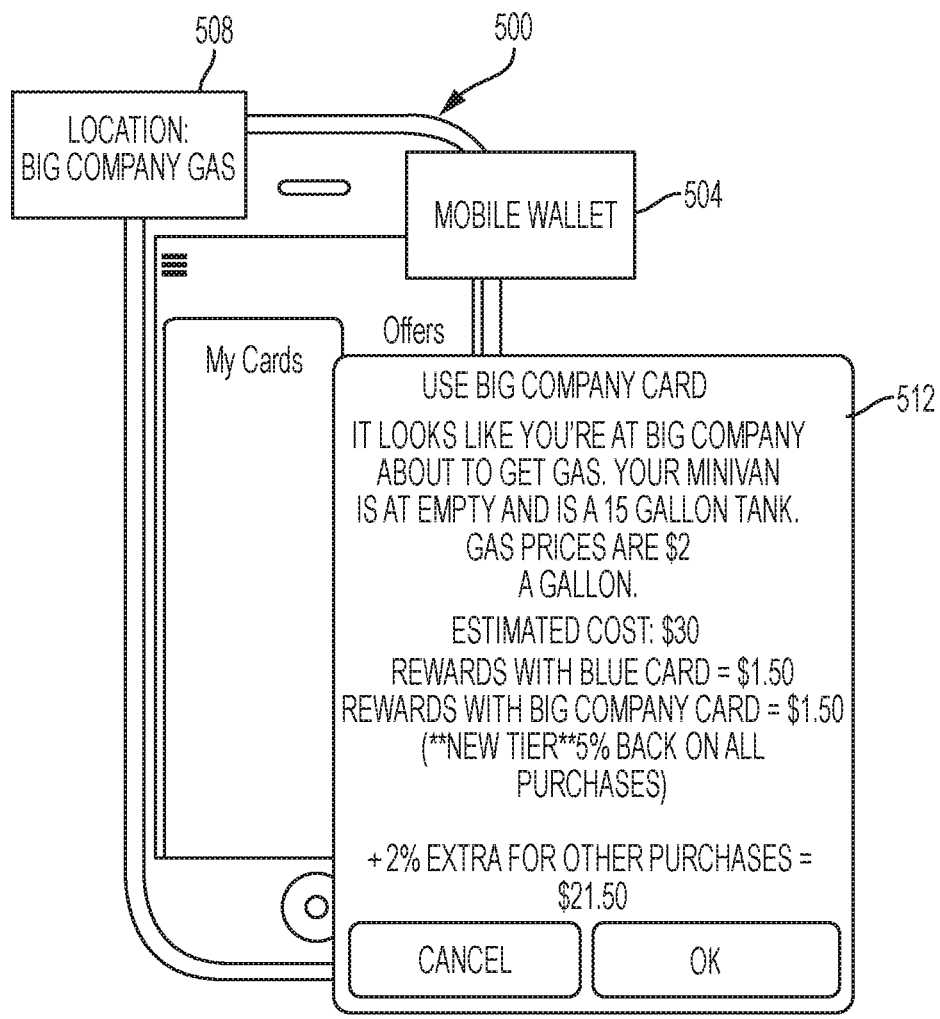
FIG. 5B is a diagrammatic representation of operation of a method according to a second embodiment of the present invention.

FIG. 5B is a diagrammatic representation of operation of a method according to a second embodiment of the present invention. Again Lisa's smart phone 500 includes a mobile wallet application 504 installed thereon and including the cognitive rewards recognition app.

In this example Lisa is considering whether to use her Blue Card or the Big Company Card for gas for her car. If Lisa spends more than $1,000 a month at Big Company, then her card rewards bump up to a 5% discount. It's currently the last day of the month and the message on her phone's display screen 512 reads:

Use Big Company Card
It looks like you're at Big Company about to
get gas. Your minivan is at empty and
is a 15 gallon tank. Gas prices are $2
a gallon.
Estimated cost: $30
Rewards with Blue card=$1.50
Rewards with Big Company card=$1.50
(new tier 5% back on all
purchases)
+2% extra for other purchases=
$21.50

The message on display 512 explains to Lisa that while at first glance it appears that both cards save $1.50, by bumping her to the next tier on her Big Company card her previous $1,000 in purchases will also qualify for the new tier savings giving her an additional $20in rewards benefits on her card. Therefore, her Big Company card is reordered in accordance with the cognitive analysis by the cognitive rewards recognition app to be listed as the first payment option in her mobile wallet for the gas purchase opportunity.

Figure 6:
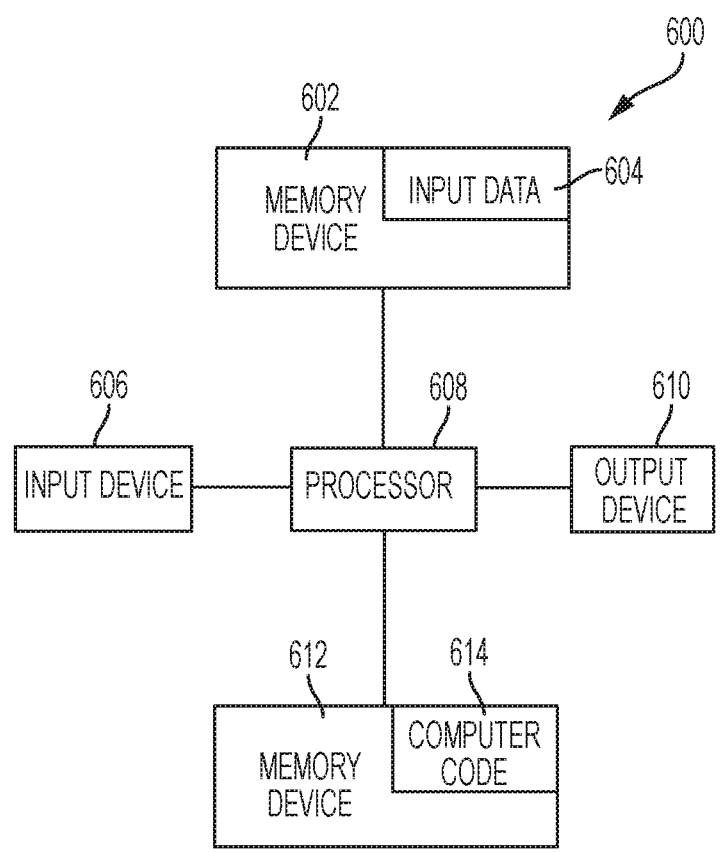
FIG. 6 is a block diagram of a computer system for implementing a search method in accordance with embodiments of the present invention.

FIG. 6 is a block diagram of a computer system, aka computing device, 600 for implementing search engine optimization based upon most popular search histories in accordance with embodiments of the present invention. The computing device 600 includes a processor 608, an input device 606 coupled to the processor 608, an output device 610 coupled to the processor 608, and memory devices 602 and 612 each coupled to the processor 608. The input device 606 may be, inter alia, a keyboard, a mouse, etc. The output device 610 may be, inter alia, a printer, a plotter, a computer screen, a magnetic tape, a removable hard disk, a floppy disk, etc. The memory devices 602 and 612 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 612 includes a computer code 614 which is a computer program that includes computer-executable instructions.

The computer code 614 includes software or program instructions that may implement an algorithm for implementing methods of the present invention. The processor 608 executes the computer code 614. The memory device 602 includes input data 604. The input data 604 includes input required by the computer code 614. The output device 610 displays output from the computer code 614. Either or both memory devices 602 and 612 (or one or more additional memory devices not shown) may be used as a computer usable storage medium (or program storage device) having a computer readable program embodied therein and/or having other data stored therein, wherein the computer readable program includes the computer code 614.

Generally, a computer program product (or, alternatively, an article of manufacture) of the computer system/device 600 may include the computer usable storage medium (or said program storage device). The processor 608 may represent one or more processors. The memory device 602 and/or the memory device 612 may represent one or more computer readable hardware storage devices and/or one or more memories.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block or step of the flowchart illustrations and/or block diagrams, and combinations of blocks/steps in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block or step in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for cognitive rewards recognition in a mobile wallet of a user, said method comprising:

determining, by a cognitive rewards recognition software application installed in the mobile wallet, a plurality of payment options and associated rewards for each item of a plurality of items, wherein the payment options are available to purchase the plurality of items in a sequence of successive purchases of the items, wherein each item is one or more goods, one or more services, or combinations thereof, wherein the rewards are user benefits, wherein a first item of the plurality of items has been designated by the user as an intended purchase by the user, wherein each other item, other than the first item, of the plurality of items has been designated by the cognitive rewards recognition software application, instead of by the user, as a possible purchase by the user, wherein each other item has a relationship with the first item, and wherein each item is configured to be purchased by the user at different times;

after said determining the plurality of payment options, determining, by the cognitive rewards recognition software application in the mobile wallet, cognitive factors distinct from the payment options, wherein the cognitive factors link and relate the user, the plurality of payment options, and the rewards pertaining to the purchases, wherein the cognitive factors are available within the user's mobile wallet and include a first cognitive factor, a second cognitive factor, a third cognitive factor, a fourth cognitive factor, a fifth cognitive factor, a sixth cognitive factor, a seventh cognitive factor, and an eighth cognitive factor, wherein the first cognitive factor is a type of purchasing venue associated with purchase of the first item, wherein the second cognitive factor is sequentially ordered tiers of purchase amounts within a specified calendar period of time at a specific location, wherein the reward associated with each tier after a first tier of the sequentially ordered tiers exceeds the reward associated with each previous tier of the sequentially ordered tiers, wherein the third cognitive factor is weather at a specific date and time at a location of a prospective purchase by the user, wherein the fourth cognitive factor is a specific flavor of a food item to be purchased, wherein the fifth cognitive factor is meta-data collected via a personalization tag and connected by opt-in data, wherein the meta-data includes items about to be discontinued and the user's marital status, gender, age, and prior purchase data, wherein the sixth cognitive factor is purchase history of the user, wherein the seventh cognitive factor is a regular schedule of the user, and wherein the eighth cognitive factor is seasonal sale events;

ascertaining, by the cognitive rewards recognition software application in the mobile wallet, a ranking of the payment options for each item to be purchased in the sequence of successive purchases, said ranking of the payment options being in a sequential order of a total reward to the user in consideration of the cognitive factors, said total reward being a summation over the reward for each item of the plurality of items to be purchased in the sequence of successive purchases;

generating, by the cognitive rewards recognition software application in the mobile wallet, a ranked list of the plurality of payment options in accordance with said ranking of the payment options;

presenting, by the cognitive rewards recognition software application in the mobile wallet, the ranked list to the user on the mobile wallet; and in response to detection of a tap by the user on the highest payment option in the ranked list, displaying to the user, by the cognitive rewards recognition software application in the mobile wallet, a message providing an explanation as to why the highest payment option in the ranked list provides the highest total reward, said explanation specifying the reward in dollars for both the highest payment option and a next payment option in the ranked list.

2. The method of claim 1, wherein said generating the ranked list for each item comprises:

determining, by the cognitive rewards recognition software application in the mobile wallet, a distribution of the rewards between the purchases in the sequence of successive purchases in response to the cognitive factors.

3. The method of claim 1, said method further comprising:

updating and re-ordering, by the cognitive rewards recognition software application in the mobile wallet, each ranked list for each item in response to changes of the purchases, changes of the rewards, or changes of the related cognitive factors.

4. The method of claim 1, wherein the plurality of payment options comprises: credit cards, debit cards, gift cards, and loyalty cards.

5. The method of claim 1, wherein the ranked list for each item comprises: explicit mention of the item, the plurality of payment options for the item, the associated rewards for each of the plurality of payment options for the item, and a message providing information for each of the plurality of payment options and the associated rewards for the item.

6. The method of claim 1, said method further comprising:

presenting, by the cognitive rewards recognition software application in the mobile wallet, to the user on the mobile wallet, data explaining reasons for cognitive decision making in generating and ordering the ranked list for each item.

7. A computer program product, comprising one or more computer readable hardware storage devices having computer readable program code stored therein, said program code containing instructions executable by a computing device to implement a method for cognitive rewards recognition in a mobile wallet of a user, said method comprising:

determining, by a cognitive rewards recognition software application installed in the mobile wallet, a plurality of payment options and associated rewards for each item of a plurality of items, wherein the payment options are available to purchase the plurality of items in a sequence of successive purchases of the items, wherein each item is one or more goods, one or more services, or combinations thereof, wherein the rewards are user benefits, wherein a first item of the plurality of items has been designated by the user as an intended purchase by the user, wherein each other item, other than the first item, of the plurality of items has been designated by the cognitive rewards recognition software application, instead of by the user, as a possible purchase by the user, wherein each other item has a relationship with the first item, and wherein each item is configured to be purchased by the user at different times;

after said determining the plurality of payment options, determining, by the cognitive rewards recognition software application in the mobile wallet, cognitive factors distinct from the payment options, wherein the cognitive factors link and relate the user, the plurality of payment options, and the rewards pertaining to the purchases, wherein the cognitive factors are available within the user's mobile wallet and include a first cognitive factor, a second cognitive factor, a third cognitive factor, a fourth cognitive factor, a fifth cognitive factor, a sixth cognitive factor, a seventh cognitive factor, and an eighth cognitive factor, wherein the first cognitive factor is a type of purchasing venue associated with purchase of the first item, wherein the second cognitive factor is sequentially ordered tiers of purchase amounts within a specified calendar period of time at a specific location, wherein the reward associated with each tier after a first tier of the sequentially ordered tiers exceeds the reward associated with each previous tier of the sequentially ordered tiers, wherein the third cognitive factor is weather at a specific date and time at a location of a prospective purchase by the user, wherein the fourth cognitive factor is a specific flavor of a food item to be purchased, wherein the fifth cognitive factor is meta-data collected via a personalization tag and connected by opt-in data, wherein the meta-data includes items about to be discontinued and the user's marital status, gender, age, and prior purchase data, wherein the sixth cognitive factor is purchase history of the user, wherein the seventh cognitive factor is a regular schedule of the user, and wherein the eighth cognitive factor is seasonal sale events;

ascertaining, by the cognitive rewards recognition software application in the mobile wallet, a ranking of the payment options for each item to be purchased in the sequence of successive purchases, said ranking of the payment options being in a sequential order of a total reward to the user in consideration of the cognitive factors, said total reward being a summation over the reward for each item of the plurality of items to be purchased in the sequence of successive purchases;

generating, by the cognitive rewards recognition software application in the mobile wallet, a ranked list of the plurality of payment options in accordance with said ranking of the payment options;

presenting, by the cognitive rewards recognition software application in the mobile wallet, the ranked list to the user on the mobile wallet; and in response to detection of a tap by the user on the highest payment option in the ranked list, displaying to the user, by the cognitive rewards recognition software application in the mobile wallet, a message providing an explanation as to why the highest payment option in the ranked list provides the highest total reward, said explanation specifying the reward in dollars for both the highest payment option and a next payment option in the ranked list.

8. The computer program product of claim 7, wherein said generating the ranked list for each item comprises:
determining, by the cognitive rewards recognition software application in the mobile wallet, a distribution of the rewards between the purchases in the sequence of successive purchases in response to the cognitive factors.

9. The computer program product of claim 7, wherein the method further comprises:
updating and re-ordering, by the cognitive rewards recognition software application in the mobile wallet, each ranked list for each item in response to changes of the purchases, changes of the rewards, or changes of the related cognitive factors.

10. The computer program product of claim 7, wherein the plurality of payment options comprises: credit cards, debit cards, gift cards, and loyalty cards.

11. The computer program product of claim 7, wherein the ranked list for each item comprises: explicit mention of the item, the plurality of payment options for the item, the associated rewards for each of the plurality of payment options for the item, and a message providing information for each of the plurality of payment options and the associated rewards for the item.

12. The computer program product of claim 7, wherein the method further comprises:
presenting, by the cognitive rewards recognition software application in the mobile wallet, to the user on the mobile wallet, data explaining reasons for cognitive decision making in generating and ordering the ranked list for each item.

13. A system, comprising a computing device, said computing device comprising one or more processors, one or more memories, and one or more computer readable hardware storage devices, said one or more hardware storage devices containing program code executable by the one or more processors via the one or more memories to implement a method for cognitive rewards recognition in a mobile wallet of a user, said method comprising:
determining, by a cognitive rewards recognition software application installed in the mobile wallet, a plurality of payment options and associated rewards for each item of a plurality of items, wherein the payment options are available to purchase the plurality of items in a sequence of successive purchases of the items, wherein each item is one or more goods, one or more services, or combinations thereof, wherein the rewards are user benefits, wherein a first item of the plurality of items has been designated by the user as an intended purchase by the user, wherein each other item, other than the first item, of the plurality of items has been designated by the cognitive rewards recognition software application, instead of by the user, as a possible purchase by the user, wherein each other item has a relationship with the first item, and wherein each item is configured to be purchased by the user at different times;

after said determining the plurality of payment options, determining, by the cognitive rewards recognition software application in the mobile wallet, cognitive factors distinct from the payment options, wherein the cognitive factors link and relate the user, the plurality of payment options, and the rewards pertaining to the purchases, wherein the cognitive factors are available within the user's mobile wallet and include a first cognitive factor, a second cognitive factor, a third cognitive factor, a fourth cognitive factor, a fifth cognitive factor, a sixth cognitive factor, a seventh cognitive factor, and an eighth cognitive factor, wherein the first cognitive factor is a type of purchasing venue associated with purchase of the first item, wherein the second cognitive factor is sequentially ordered tiers of purchase amounts within a specified calendar period of time at a specific location, wherein the reward associated with each tier after a first tier of the sequentially ordered tiers exceeds the reward associated with each previous tier of the sequentially ordered tiers, wherein the third cognitive factor is weather at a specific date and time at a location of a prospective purchase by the user, wherein the fourth cognitive factor is a specific flavor of a food item to be purchased, wherein the fifth cognitive factor is meta-data collected via a personalization tag and connected by opt-in data, wherein the meta-data includes items about to be discontinued and the user's marital status, gender, age, and prior purchase data, wherein the sixth cognitive factor is purchase history of the user, wherein the seventh cognitive factor is a regular schedule of the user, and wherein the eighth cognitive factor is seasonal sale events;

ascertaining, by the cognitive rewards recognition software application in the mobile wallet, a ranking of the payment options for each item to be purchased in the sequence of successive purchases, said ranking of the payment options being in a sequential order of a total reward to the user in consideration of the cognitive factors, said total reward being a summation over the reward for each item of the plurality of items to be purchased in the sequence of successive purchases;

generating, by the cognitive rewards recognition software application in the mobile wallet, a ranked list of the plurality of payment options in accordance with said ranking of the payment options;

presenting, by the cognitive rewards recognition software application in the mobile wallet, the ranked list to the user on the mobile wallet; and in response to detection of a tap by the user on the highest payment option in the ranked list, displaying to the user, by the cognitive rewards recognition software application in the mobile wallet, a message providing an explanation as to why the highest payment option in the ranked list provides the highest total reward, said explanation specifying the reward in dollars for both the highest payment option and a next payment option in the ranked list.

14. The system of claim 13, wherein said generating the ranked list for each item comprises:

determining, by the cognitive rewards recognition software application in the mobile wallet, a distribution of the rewards between the purchases in the sequence of successive purchases in response to the cognitive factors.

15. The system of claim 13, said method further comprising:

updating and re-ordering, by the cognitive rewards recognition software application in the mobile wallet, each ranked list for each item in response to changes of the purchases, changes of the rewards, or changes of the related cognitive factors.

16. The system of claim 13, wherein the ranked list for each item comprises: explicit mention of the item, the plurality of payment options for the item, the associated rewards for each of the plurality of payment options for the item, and a message providing information for each of the plurality of payment options and the associated rewards for the item.

17. The system of claim 13, wherein the method further comprises:

presenting, by the cognitive rewards recognition software application in the mobile wallet, to the user on the mobile wallet, data explaining reasons for cognitive decision making in generating and ordering the ranked list for each item.

* * * * *